United States Patent
Saporetti

(10) Patent No.: US 9,247,218 B2
(45) Date of Patent: Jan. 26, 2016

(54) METHOD FOR IMAGE ACQUISITION

(75) Inventor: Claudio Saporetti, Bologna (IT)

(73) Assignee: DATALOGIC IP TECH S.R.L., Calderara di Reno (Bologna) (IT)

(*) Notice: Subject to any disclaimer, the term of this patent is extended or adjusted under 35 U.S.C. 154(b) by 378 days.

(21) Appl. No.: 13/983,619

(22) PCT Filed: Feb. 10, 2012

(86) PCT No.: PCT/IB2012/050599
§ 371 (c)(1),
(2), (4) Date: Aug. 5, 2013

(87) PCT Pub. No.: WO2012/110925
PCT Pub. Date: Aug. 23, 2012

(65) Prior Publication Data
US 2013/0307977 A1    Nov. 21, 2013

(30) Foreign Application Priority Data

Feb. 15, 2011   (IT) .............................. MO2011A0031

(51) Int. Cl.
*H04N 7/18*      (2006.01)
*G06K 7/10*      (2006.01)
(52) U.S. Cl.
CPC ............ *H04N 7/183* (2013.01); *G06K 7/10752* (2013.01); *G06K 7/10861* (2013.01)
(58) Field of Classification Search
None
See application file for complete search history.

(56) References Cited

U.S. PATENT DOCUMENTS

2003/0142211 A1   7/2003   Stamm
2009/0095600 A1   4/2009   Reichenbach

FOREIGN PATENT DOCUMENTS

WO      2008/078129 A1    7/2008

OTHER PUBLICATIONS

International Search Report issued Apr. 12, 2012, in counterpart PCT Application No. PCT/IB2012/050599.

*Primary Examiner* — Geepy Pe
*Assistant Examiner* — Janese Duley
(74) *Attorney, Agent, or Firm* — Duane Morris LLP

(57) ABSTRACT

A method for image acquisition of an object in transit on a movable supporting surface includes detecting a presence signal of the object in a preset position, and at least one dimension and/or position signals, the signals being generated by at least one sensor arranged upstream of a linear camera; detecting a "trigger event" signal, generated on the basis of the presence signal, the linear camera starting to acquire an image on the basis of the "trigger event" signal; starting to acquire an image of the object, when the object has travelled a preset distance from the preset position, the distance being calculated by an advance sensor suitable for generating a signal comprising an electric pulse at each preset movement of the movable supporting surface; and setting a mode for image acquisition of the linear camera on the basis of a resolution of the advance sensor.

12 Claims, 2 Drawing Sheets

METHOD FOR IMAGE ACQUISITION

BACKGROUND AND SUMMARY OF THE INVENTION

The invention relates to a method for image acquisition actuated by a system for image acquisition provided with optical devices for image acquisition of the digital camera type, in particular fixed optical devices.

In the present description and in the subsequent claims the expression "optical device for image acquisition" is intended for a device capable of acquiring images of an object and particularly optical information associated with an object placed on a supporting plane, e.g. object identifying data, such as, for example, an optical code associated with the object.

The expression "optical information" is intended for any graphical representation constituting a coded or non-coded information. A particular example of optical information consists of linear or bi-dimensional optical codes, wherein the information is coded by means of suitable combinations of elements of predetermined shape, for example squares, rectangles or hexagons of dark colour (normally black) separated by clear elements (spaces, normally white) such as barcodes, stacked codes and bi-dimensional codes in general, colour codes, etc. The expression "optical information" further comprises, more generally, also other graphical shapes, including printed or handwritten characters (letters, numbers, etc.) and particular shapes (so-called "patterns"), such as, for example, stamps, logos, signatures, fingerprints, etc. The expression "optical information" also comprises graphical representations detectable not only in the range of visible light, but also in the entire range of wavelength comprised between infrared and ultraviolet.

It is known from the prior art to use, in systems for image acquisition, linear digital cameras comprising (linear) monodimensional arrays of photosensors, in particular of the CCD or C-MOS type, to acquire images of parcels, or objects in general, travelling on a conveyor belt, or on other movement and conveying systems, and to read through said linear digital cameras the optical information printed or affixed thereupon. Hereinafter, said linear digital cameras will be described more concisely as linear cameras. The expression "fixed optical device for image acquisition" is intended for an optical device for image acquisition that is used without human operation (so-called "unattended scanner"). The object detection typically comprises reading an optical and/or character code.

The systems for image acquisition known from the prior art typically comprise at least one linear camera and a lamp or solid state lighting system. In most cases, then, one or more reflecting mirrors are present. These components can be housed in a common container or in separated containers.

The linear camera has the function of collecting the image from which the information for identifying an object has to be extracted. This image can be the image of the object as a whole or of an optical code—as defined above—contained therein. The image acquisition occurs by means of a suitable optical system and a dedicated optoelectronics and electronics, wherein an optical sensor exists consisting of a CCD or a C-MOS of linear type comprising an array of photosensitive elements (also called pixels).

The image is acquired by storing subsequent scans, each of which represents a very thin "line" of the whole image. The movement of the supporting plane, or of the object, at the fixed reading station, enables successive lines of the image to be acquired and, then, the complete image to be acquired. The lighting system enables the acquisition zone to be lighted with the appropriate light levels and lighting angles.

The deflecting mirror, or deflecting mirrors, enables the installation of the device for image acquisition to be optimised from the point of view of the occupied space with respect to the conveying device of the objects and thus enables the field of view of the linear camera (defined below), and possibly also the beam of light emitted by the lighting system, to be oriented to the desired area.

As already said, the linear camera acquires the image of the object row by row and transmits the image to a decoder, which can be separated from the linear camera, or integrated therein, and which reconstructs the image acquired by the linear camera by assembling all the rows and then processes the image in order to extract (decode) the information of the optical codes and/or other optical information, or to send the information and make the information available to a further processing apparatus. The decoding algorithm performs a bi-dimensional analysis of the acquired images whereby a code, or a sequence of characters can be properly read, which has any orientation. For this reason, systems of linear cameras having linear sensors are considered omnidirectional acquiring and reading systems.

The image acquisition is controlled by a microprocessor that, typically, is contained in the linear camera, but can also be external and connected thereto. The microprocessor receives information from external sensors, such as, for example, object height sensors, object presence sensors, distance sensors, speed sensors, and exploits this information to adjust the operating parameters of the linear camera, such as, for example, sensitivity, position of an autofocus system, scanning frequency, etc.

In order to be able to acquire images and read optical information over a wide range of linear camera-object distances, as it is typical for industrial applications (for example for identifying and sorting parcels), it is usual to provide the linear camera with an autofocus system in which the optical receiving system (or part thereof), or the sensor, moves to modify the focus parameters of the linear camera and enable optical information to be read on objects of different shapes and sizes. Usually, the autofocus system of the linear camera "follows" the shape of the objects on the basis of the information about the height provided by the height or distance sensors such as, for example, photocell barriers.

The expression "depth of field" is used herein to indicate the range of linear camera-object distances, in a neighbourhood of the distance of perfect focus that is set each time by the autofocus system, wherein the object is sufficiently focused to enable the optical information to be read.

As indicated above, the linear camera needs some essential information for properly setting its operating parameters, in order to acquire the optical information associated with the moving objects.

In particular, the linear camera has to know the speed of the objects. Usually, if, for example, the conveying device is a conveyor belt or a plate conveyor a speed sensor is associated therewith, that can be, for example, an optical encoder that generates a square wave, the frequency of which is proportional to the belt speed. The encoder is in fact a belt advance sensor, from which the movement speed of the belt and thus also of the objects is obtained by derivation. The speed of the conveyor belt is also used to define the position of the objects on the conveyor belt.

Determining the position of each object on the conveyor belt is necessary to avoid assigning a code of an object to another object, this in order to enable a correct traceability of the objects.

Further, determining the position of each object on the conveyor belt is necessary for focusing each linear camera in the correct point, in particular when a code has to be read that is located on a front face of the objects.

For a correct and efficient operation of the autofocus system, the linear camera also has to know the height of the objects or, if it is a linear camera designed for reading codes on a side face of the objects, it has to know the lateral position of the objects, i.e. the distance of the objects from the edges of the supporting plane. Height and distance sensors are then provided, such as, for example, photocell barriers and laser sensors that measure the time of flight of the emitted laser beam, said sensors being placed upstream the linear camera or cameras.

The linear camera must especially know when acquisition of the sequence of rows, or lines, constituting the image (so-called 'frame') has to be started, and how long acquisition has to last. In systems with a plurality of linear cameras it is furthermore necessary that every object has the same identification for all the linear cameras. For this reason, all the linear cameras of the system share the same source of "frame trigger" for starting the acquisition of the sequence of rows.

This source is typically a presence sensor (for example a photocell) that detects the presence of an object on a horizontal line that is perpendicular to the direction of the conveyor belt and generates the signal of "frame trigger". Alternatively, the height sensor can be provided as the device of "frame trigger". The signal of "frame trigger" is generated when the measured height exceeds a certain preset threshold.

The start and the end of the "frame" acquisition are determined from a start/stop signal generated by the "frame trigger" device. However, acquisition does not start as soon as the "frame trigger" device detects an object, but starts with a delay that is preset for every linear camera of the system, a delay that depends on the distance between the "frame trigger" device and the view line of the linear camera on the belt plane, on the view angle of the linear camera, on the speed of the objects, on the measured height thereof and/or on the measured distance thereof from the edges of the supporting plane and/or on the overall dimensions thereof along the direction of the conveyor belt. All the sensors disclosed above can be physically connected to the linear camera(s) or to a control device that processes the information and "distributes" the information to the linear camera(s).

The control device controls all the sensors and can also control the lighting devices.

The information provided by the sensors is distributed to the linear cameras and every camera, on the basis of this information and the positioning of the linear camera itself, adapts its own acquisition parameters.

In particular, each linear camera, on the basis of the information on the speed of the objects, adjusts its own acquisition frequency (or scanning frequency, i.e. the number of lines acquired per second).

A method for image acquisition that is used in prior art acquisition systems calculates the position of the object on the conveyor belt, determining the average speed of the conveyor belt in a preset range. As the space S through which an object travels in a period T of the encoder is constant, the average speed Vm can be measured by simply dividing the space travelled in a preset number of periods T of the encoder by the total duration of said periods, i.e. $Vm = nS/(T1+T2+ \ldots Tn)$. A first calculation of the average speed is made in the range between the "frame trigger" and the start of image acquisition. Subsequently, after the start of image acquisition, the value of the average speed is recalculated for each encoder period, in such a manner as to adapt the image acquisition parameters to possible variations of said average speed. This method for image acquisition also adjusts the scanning frequency of each linear camera on the basis of the average speed of the conveyor belt, calculated as specified above. This method for image acquisition is used, in particular, if the resolution of the encoder available on the conveyor belt is rather poor.

A drawback of this method for image acquisition is that the advance speed of the object on the conveyor belt, i.e. the speed of the conveyor belt, detected on the basis of the period of the encoder, as disclosed above, does not necessarily reflect the actual speed of the conveyor belt at the moment in which image acquisition starts.

In other words, the speed calculated for establishing the scanning frequency of the linear camera in acquiring a line of image does not represent the instantaneous speed of the conveyor belt at the moment in which scanning frequency is adjusted, but an average speed calculated over a period of time preceding the moment of acquisition of said line of image.

Consequently, when adjusting the scanning frequency, it is assumed that the speed of the belt remains constant even for a period of time after the period in which it is detected, i.e. when scanning of the line of image starts.

A deviation of the calculated value of the speed of the conveyor belt, used to establish the scanning frequency with respect to the actual value of the speed at the moment of acquisition of a row of image, determines an incorrect calculation of the acquisition parameters of the linear camera and distorted acquisition of the row of image, which can lead, if it is repeated for a high number of rows of the image to be acquired, to a poor quality image that cannot be decoded correctly.

In particular, the relations between the parameters of the linear camera and the conditions of the line of the conveyor belt are set out below: the acquisition period, and, thus, acquisition frequency, depends on the speed of the objects and can also depend on the height of the objects; and the sensitivity and position of the focus of the linear camera depend on the distance or height of the objects (high objects are normally more lighted).

This means, as already said, that, if the parameters of the linear camera are not correctly adapted to the instantaneous speed of the conveyor belt, there is the risk of acquiring distorted images of the codes or of not acquiring the images at all.

Further, a deviation of the speed of the conveyor belt with respect to the actual speed causes an incorrect calculation of the position of the object on the conveyor belt, entailing the risk of assigning a code of an object to another object, when the data relating to the images are transmitted to a host and, for traceability, it is ascertained which code/s is/are applied to a determined object.

This drawback is particularly accentuated in the event of sudden accelerations/decelerations that occur over the lapse of time in which it is assumed that the speed of the belt remains the speed calculated in the last period of the interval of time of acquisition of the belt speed.

The aforesaid method for image acquisition is thus rather approximate and only suitable for conveyor belts that always move at a substantially constant speed, further, in this method there is not provided the possibility of a temporary stop of the conveyor belt. In this latter case, in fact, in the neighbourhood of the stopping point the detected images would certainly be distorted, because of the fact that the speed of the belt tends to vary very rapidly, both during the deceleration step before the stop and during the restart step after the stop and it is thus not possible to calculate correctly the scanning frequency of the linear camera in the aforesaid steps.

An object of the invention is to overcome the drawbacks of known methods for image acquisition.

Another object of the invention is to provide a method for image acquisition that, once it has been implemented, enables correct images to be acquired in any operating condition of a supporting plane on which an object transits that has "optical information" to be acquired.

A further object of the invention is to provide a method for image acquisition that, once it has been implemented, enables the parameters of a linear camera to be set, said linear camera having to acquire images of the object in the manner that conforms as closely as possible to the actual advance conditions of the supporting plane.

According to the invention a method for image acquisition is provided as defined in claim 1.

Owing to the invention, it is possible to obtain a method of image acquisition that enables the parameters of the linear camera to be set in function of the actual conditions of the supporting plane and also regardless of the speed thereof.

Further, the method according to the invention enables it to be avoided that the photosensors of the linear camera become saturated, thereby preventing correct acquisition of the codes to be detected.

BRIEF DESCRIPTION OF THE DRAWINGS

The invention can be better understood and implemented with reference to the attached drawings that illustrate an embodiment thereof by way of a non-limiting example in which.

DETAILED DESCRIPTION

Figure 1:
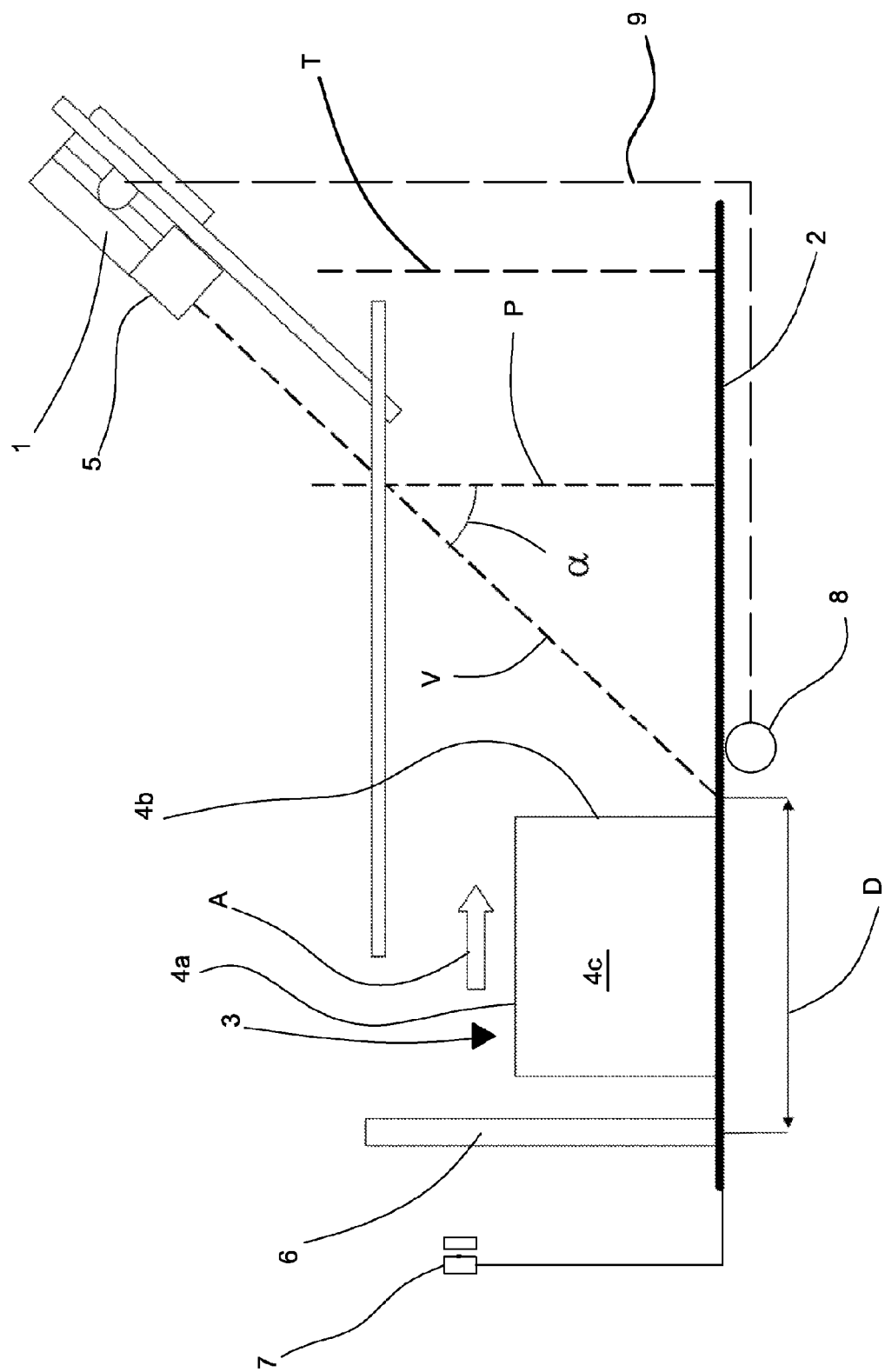
FIG. 1 is a scheme of a system for image acquisition that uses a method for image acquisition according to the invention.

With reference to FIG. 1, a system for image acquisition is shown schematically that comprises at least one digital camera 1, placed above a conveying plane, for example a conveyor belt 2, on which objects 3 travel.

Such objects 3 advance along an advancing direction A indicated in FIG. 1 by an arrow.

In FIG. 1 there is shown a sole object 3 in the shape of a box body, nevertheless on the conveyor belt 2 a plurality of objects 3, which can have any shape, advance in succession along the advancing direction A.

The digital camera 1 is preferably of the linear type, i.e. comprising mono-dimensional arrays of photosensors, in particular of the CCD or C-MOS type.

The linear camera 1 is arranged for reading identifying codes, for example a barcode, impressed on or applied to a face of the object 3, for example an upper face 4a and/or a frontal face 4b, and/or on a side face 4c.

The linear camera 1 is associated with a lighting device 5, for example a LED or solid state or lamps lighting device in general, that lights the zone (generally a plane) of the object 3 in which the linear camera 1 has to carry out the reading.

When it is not known on which face 4a, or 4b, or side faces 4c, of the objects 3 the code is placed or when one or more codes are present on several faces of the objects 3, it is necessary to provide a multisided system or multiple reading station system with several linear cameras 1, with a corresponding lighting device 5 associated with each of them.

The lighting device 5 can generate light pulses to light the object 3.

The linear camera 1 can read the codes placed on the face 4a, or 4b, or side faces 4c of the object 3 both directly and by a mirror or a system of mirrors that is used when it is not possible or economical to arrange the linear camera for direct reading.

The linear camera 1 is provided with an autofocus system, owing to which it focuses substantially one line at a time of the reading zone on the face 4a, or 4b, of the object 3. The line of perfect focus is said view line and represents the projection of the sensor of the linear camera 1 through the optical receiving system of the linear camera, at the distance of perfect focus. The totality of the view lines (or reading lines) at the various distances permitted by the autofocus system forms the reading field, also known as the field of view, of the linear camera 1.

The reading field lies on a plane called the view plane V. Between the view plane V and a plane P that is perpendicular to the plane of the conveyor belt 2 an angle $\alpha$ is defined that is called the reading angle or view angle.

For a correct and efficient operation of the autofocus system, the linear camera 1 has to know the height of the objects 3. A reference value of the height of the objects can be set in the linear camera 1 if the height of the objects can vary, with respect to said reference value, within the limits of the depth of field of the linear camera 1. Nevertheless, more frequently, along the conveyor belt 2, upstream of the linear camera 1, in the advancing direction A of the objects 3, a height sensor 6 is provided, for example a photocell barrier, or a laser sensor, that detects the height of the arriving object 3. The height sensor 6 identifies when the object 3 enters its own reading field and when it exits its own reading field. The height sensor 6 thus also acts as a presence sensor, i.e. in addition to detecting the height of the object 3, it also detects the presence thereof in a preset position along the conveyor belt 2 and the overall dimensions thereof in the advancing direction of the conveyor belt 2.

Nevertheless, in addition to the height sensor 6, in order to increase the precision of the detection of the presence of an object 3, it is possible to provide a presence sensor 7, for example arranged upstream of the height sensor 6.

The height sensor 6 and the possible presence sensor 7 can be connected physically to the linear camera 1 or to a control device, which is not shown, that processes and "distributes" the information to the linear camera 1.

Also, with the conveyor belt 2 an advance sensor 8 is associated, for example an encoder, to detect the position of the objects 3, moving along the conveyor belt 2. For example, the advance sensor 8 can be suitable for generating an electric pulse at each preset movement of the conveyor belt 2, and, consequently of the object 3, this movement representing the resolution of the advance sensor 8. Also the advance sensor 8 can be physically connected to the linear camera 1, or to the control device.

When an object 3 approaches the reading field of the linear camera 1, a "trigger event" signal is generated by a "trigger event" source, which can, for example, be the height sensor 6, or the presence sensor 7, which detect the presence of an object 3 in a preset position along the conveyor belt 2. Alternatively, the "trigger event" signal can be generated by a control device, such as, for example, a PLC (Programmable Logic Controller) associated with the conveyor belt 2. The PLC can also transmit to the linear camera 1 the advancing signal generated by an advance sensor connected to the PLC.

The "trigger event" signal enables the linear camera 1 to use the count of the number of pulses emitted by the advance sensor 8 after the "trigger event" signal to determine the position of the object 3 on the conveyor belt 2. When the linear camera 1 or the control device detect that the object has travelled a distance D between the "trigger event" source and the intersection of the view plane V of the linear camera 1 with the plane of the conveyor belt 2, image acquisition by the linear camera 1 starts, said distance D being calculated on the basis of the number of pulses emitted by the advance sensor 8 after the "trigger event" signal.

According to a first mode for image acquisition according to the present invention, image acquisition frequency of the linear camera 1 is adjusted in function of the advance speed of the object 3 on the conveyor belt 2, said speed being calculated in function of the period T of the signal emitted by the advance sensor 8, whereas at least one other image acquisition parameter such as the sensitivity and possibly the focus position of the linear camera 1 is adjusted in function of the position of the object 3 on the conveyor belt 2, said position being calculated by the linear camera 1, or by the control device, by counting the pulses of the signal of the advance sensor 8, emitted after the "trigger event" signal. The sensitivity of the linear camera 1 is adjusted by using an electronic shutter. In other words, the exposure time of the electronic shutter is adjusted in function of the position of the object 3 on the conveyor belt 2, determined on the basis of the count of the pulses emitted by the advance sensor 8 after the "trigger event" signal.

If the conveyor belt 2 stops, which is detected by the linear camera 1, or by the control device, because the count of the pulses emitted by the advance sensor 8 stops, image acquisition is suspended by keeping the electronic shutter shut and switching off the lighting device 5 associated with the camera 1, until the count of the pulses emitted by the advance sensor 8 resumes, which indicates that the conveyor belt 2 has started to move again.

This first mode for image acquisition enables the position of the object 3 on the conveyor belt 2 to be calculated with greater precision than with the methods known from the prior art and independently of the calculation of the speed of the conveyor belt.

This first mode for image acquisition is advantageously usable if the advance sensor 8 has an average resolution, for example lower or the same as 5 mm (which means that the encoder emits a pulse for every 5 mm of advance of the conveyor belt).

According to a further mode for image acquisition according to the present invention, which is usable if the resolution of the advance sensor 8 is high, for example equal to about 0.1-0.2 mm, the image acquisition frequency is synchronised with the pulses emitted by the advance sensor 8, in other words the pulses emitted by the advance sensor 8 act as a synchronising signal for the acquisition of the image lines by the linear camera 1, such that image acquisition frequency of the linear camera 1 is proportional to the frequency of the signal emitted by the advance sensor 8. For example, acquisition frequency can be the same as the frequency of the signal emitted by the advance sensor 8, such that the acquisition of each line of image is commanded by a pulse of the signal of the advance sensor 8, or the image acquisition frequency can be the same as a submultiple of the frequency of the signal of the advance sensor 8, such that the acquisition of each line of image occurs at every n pulses of said signal. An image acquisition frequency that is the same as a submultiple of the frequency of the signal of the advance sensor 8 can be provided in the case of advance sensors having a very high resolution, for example lower than 0.1 mm. The other acquisition parameters of the linear camera 1, i.e. the focus position of the linear camera 1 and the acquisition sensitivity of the image were adjusted previously, whilst the object 3 advanced by said distance D. In particular, the focus position of the linear camera 1, in the presence of the autofocus system, is established on the basis of the shape of the object 3 measured by the height sensor 6, inasmuch as it has to adapt as much as possible to the shape of the object 3 and the sensitivity of the linear camera 1 depends on the distance or height of the object 3 (high objects are normally more lighted).

The scanning frequency of the linear camera 1, as already said, depends on the frequency of the pulses of the advance sensor 8. In fact, from the instant in which the object 3 reaches the image acquisition start position, after travelling said distance D, the linear camera 1 switches on its lighting device 5 and starts to acquire image lines at an image acquisition frequency that is proportional to the frequency of the signal of the advance sensor 8.

As image acquisition frequency is not calculated on the basis of the speed of advance of the object 1 but is synchronised with the signal of the advance sensor 8, speed variations, even sudden speed variations, do not affect image acquisition, inasmuch as the linear camera 1 is always synchronised with the actual position of the object on the conveyor belt 2.

In this further mode for image acquisition, it is necessary for the advance sensor 8 to have greater resolution than what is necessary for the linear camera 1, for the particular application for which it is used.

If a plurality of linear cameras 1 is present, one of these linear cameras 1 takes on the role of master device, receiving the synchronising signal from the advance sensor 8 and distributing the synchronising signal to the other linear cameras 1.

In the same manner, the master linear camera receives the information relating to the height sensor 6 and to the presence sensor 7.

The system for image acquisition further comprises a system for sending the synchronising signal of the advance sensor 8, in particular a physical data transmission line 9 dedicated only to the distribution of the aforesaid signal. The physical line 9 is shown schematically in FIG. 1 by a dashed line.

Owing to the dedicated physical line, the synchronising signal reaches the linear camera 1 without significant delays or alterations.

Making image acquisition frequency independent of the speed of the conveyor belt 2 and thus of the object 3, adjusting image acquisition frequency only on the basis of the pulses emitted by the advance sensor 8 makes the system for image acquisition much more efficient, enabling undistorted images to be obtained in any situation.

Image acquisition guided by the pulses of the advance sensor further enables distortions of the image to be avoided that may occur in the event of a temporary stop of the conveyor belt 2.

In fact, by releasing image acquisition frequency from the speed of advance of an object 3 along the conveyor belt 2, it is possible to avoid distortions of the acquired image in the event of a stop of the conveyor belt 2, unlike what happens when image acquisition frequency is adjusted on the basis of the advance speed of the object 3 calculated on the basis of the period of the signal of the advance sensor 8.

In fact, in the latter case, when the speed of the conveyor belt 2 falls below a certain threshold, i.e. just before a stop and immediately after a restart of the conveyor belt 2, the measurement of the speed of the conveyor belt 2 is very imprecise, because of the fact that the period of the advance sensor 8 tends towards the infinite as the speed of the conveyor belt 2 tends towards zero. Further, when the conveyor belt 2 starts up again, the speed can be calculated only after the advance sensor 8 has emitted at least two pulses. There is thus an interval of time, which is longer or shorter according to the sensitivity of the advance sensor 8, during which the linear camera 1, or the control device, are not able to detect that the conveyor belt 2 has started to move again, so the calculation of the speed during the belt restarting step is affected by significant error, which adversely affects correct image acquisition, because it means that the scanning frequency of the linear camera 1 in this step, calculated on the basis of the speed of the conveyor belt 2, is noticeably different from optimum scanning frequency, i.e. the scanning frequency adapted to the actual speed of the conveyor belt 2 at the moment of acquisition, this meaning that the images of the object 3 acquired near the stopping point can be even greatly distorted.

By synchronising, on the other hand, the image acquisition frequency with the pulses of the advance sensor 8, the aforesaid drawback is avoided inasmuch as the acquisition does not depend on a calculation of the speed of the belt. Further, in the event of the object 3 stopping, image acquisition resumes as soon as the advance sensor 8 emits the first pulse after the conveyor belt 2 restarts, thus with a minimum delay with respect to the instant of restart of the conveyor belt 2.

Also in this further mode for acquisition, an electronic shutter of the linear camera 1 can be used advantageously, synchronising also the electronic shutter with the pulses emitted by the advance sensor 8, such that after each acquisition of a line of the image the electronic shutter shuts, preventing subsequent acquisition until the linear camera 1 receives a new pulse from the advance sensor 8 that commands the acquisition of a new line of image.

In this manner, it is ensured that the same line of the image of the object 3 is not acquired more than once if the object 3 stops.

This enables phenomena of saturation of the photosensors that make up the linear camera 1 to be avoided.

In both the modes for image acquisition according to the present invention, the interval of acquisition of the images of the object 3, i.e. the duration of the interval of time during which the linear camera 1 has to acquire the image of the object 3, is determined by the height sensor 6 that detects, on the one hand, the height of the object 3, necessary information for acquiring a code placed on the front face 4b and, on the other hand, the overall dimensions of the object 3 in the advancing direction of the conveyor belt 2, which information is necessary for acquiring a code placed on the upper face 4a of the object 3. If there are one or more linear cameras dedicated to image acquisition from the side faces 4c of the object 3, the duration of the interval of time, during which this linear camera has to acquire the image of the object 3, is determined by one or more distance sensors that measure on the one hand the position of the object 3 on the conveyor belt 2, by, for example, measuring the distance of the object 3 from the edges of the conveyor belt 2, and on the other hand the overall dimensions of the object 3 in the advancing direction of the conveyor belt 2.

Returning to the particular case of FIG. 1, on the basis of the information relating to the height and/or the overall dimensions of the object 3 determined before the start of the acquisition by the height sensor 6, it is thus possible to establish when to interrupt image acquisition, determining the end of acquisition of the linear camera 1.

In fact, once the shape of the object 3 is known, the linear camera 1 interrupts acquisition after a determined number of pulses of the advance sensor 8 have elapsed since the start of acquisition, said pulses being proportional to an advance of the object 3 along the conveyor belt 2 that is sufficient to enable the linear camera 1 to acquire a complete image of the face 4a, or 4b, or 4c.

In general, depending on the arrangement of linear cameras 1 set up for image acquisition from one or more faces of the object 3, the end of image acquisition is determined, for each linear camera 1, by an acquisition end signal that depends on the height or on the overall dimensions of the object 3 that were detected by the height sensor 6, or by the position of the object on the conveyor belt 2, or on the overall dimensions of the object 3 detected by one or more distance sensors.

Figure 2:
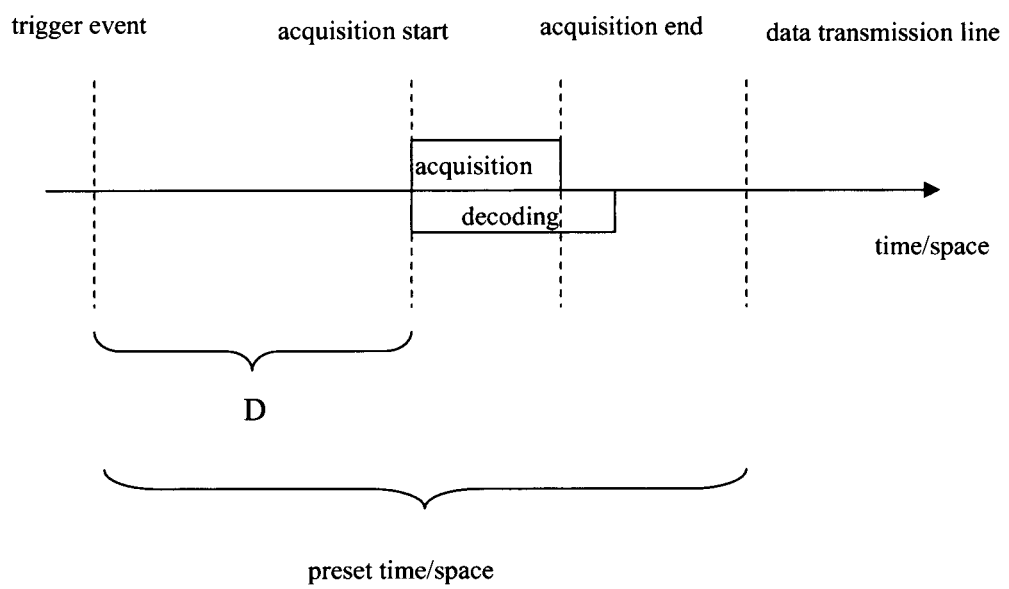
FIG. 2 is a diagram that illustrates timing of the steps of the method for image acquisition according to the invention.

In both the modes for image acquisition according to the present invention, the succession of the steps of "trigger event", acquisition start and acquisition end is shown in FIG. 2.

The images acquired by each linear camera 1, in the form of a series of image lines, are sent to a respective decoder, associated with each linear camera 1, which reconstructs the image acquired by the linear camera 1 by assembling all the rows of the image and processing the image to extract the information of the optical codes and/or other information.

The decoders can communicate with one another by using, for example, a TCP/IP protocol on Ethernet, or a field bus. One of the decoders acts as a master and collects the data from the various decoders and transmits the data to the host. Alternatively, the data processed by each decoder can be sent, for example through a hub, to a data processing system, for example a personal computer, for storage and possible further processing.

The data acquired by each linear camera 1 and sent to each decoder are sent to the host when the object 3 has travelled a preset distance from the source of the "trigger event" signal, reaching a so-called data transmission position indicated, merely by way of example, by line T in FIG. 1. The fact that the data transmission acquired from the linear camera 1 occurs only when an object 3 reaches the data transmission position enables the detected codes to be assigned to a determined object 3, in order to enable the object 3 to be traced without the risk that the codes detected on an object 3 being assigned to another object 3. Alternatively, the data acquired by each linear camera 1 are sent to the host as soon as they are available, the data being associated with the value of the signal generated by the advance sensor 8.

The mode for image acquisition can be preset on the linear camera 1, or on the control device, on the basis of the known resolution of the advance sensor 8 associated with the conveyor belt 2.

Alternatively, the linear camera 1, or the control device, can be configured in such a manner as to recognise automatically the resolution of the advance sensor 8 that is associated with the conveyor belt 2 and implement a different mode for image acquisition depending on whether it is a low-resolution advance sensor, in which case the method for image acquisition known from the prior art is implemented, a medium-resolution advance sensor, in which case the first mode for image acquisition according to the present invention is implemented, or a high-resolution advance sensor, in which case the further mode for image acquisition according to the present invention is implemented.

Alternatively, the resolution of the advance sensor, instead of being detected automatically by the linear camera 1, can be set manually by an operator on the linear camera 1.

The invention advantageously permits great versatility and adaptability in different operating conditions, owing to the different resolution of the encoder.

What is claimed is:

1. A method for image acquisition of an object in transit on a movable supporting surface, comprising the following steps:
arranging at least one optical device for image acquisition comprising a respective linear camera associated with a lighting device;
detecting a presence signal of said object in a preset position on said movable supporting surface, and signals indicating at least one dimension and/or the position of said object on said movable supporting surface, said signals being generated by at least one sensor arranged upstream of said linear camera in the advancing direction of said movable supporting surface;
detecting a trigger event signal, generated on the basis of said presence signal, said linear camera starting to acquire an image of said object on the basis of said trigger event signal;
starting to acquire an image of said object by said linear camera, when said object has travelled a preset distance from said preset position, said distance depending on said at least one dimension of said object and/or on the position of said object on said movable supporting surface, said distance being calculated by an advance sensor associated with said movable supporting surface, said advance sensor being suitable for generating a signal comprising an electric pulse at each preset movement of said movable supporting surface, said advance sensor being operationally connected to said linear camera, or to a control device that controls said linear camera, wherein the method further comprises setting a mode for image acquisition of said linear camera on the basis of the resolution of said advance sensor, said resolution consisting of a distance travelled by said movable supporting surface in the time that elapses between two successive pulses generated by said advance sensor.

2. The method according to claim 1, wherein said setting comprises selecting said acquisition mode from a plurality of different acquisition modes.

3. The method according to claim 1, wherein said resolution is detected automatically by said linear camera, or by said control device.

4. The method according to claim 1, wherein said resolution is set by an operator in said linear camera, or in said control device.

5. The method according to claim 1, wherein said setting comprises:
adjusting an image acquisition frequency of said linear camera on the basis of the period of the signal generated by said advance sensor;
adjusting at least one further acquisition parameter of said linear camera in function of a position of said object on said movable supporting surface, said position being calculated by counting the number of pulses emitted by said advance sensor after said trigger event signal has been emitted.

6. The method according to claim 1, wherein said adjusting comprises:
synchronising an image acquisition frequency of said linear camera with the pulses emitted by said advance sensor, in such a manner that an image line is acquired for every single pulse emitted by said advance sensor, or for every preset multiple of said single pulse;
adjusting at least one further parameter of said linear camera in function of a position of said object on said movable supporting surface, said position being calculated by counting the number of pulses emitted by said advance sensor after said trigger event signal has been emitted.

7. The method according to claim 5, wherein said advance sensor has a resolution in the order of a few millimeters.

8. The method according to claim 6, wherein said advance sensor has a resolution of approximately 0.1-0.2 mm.

9. The method according to claim 5, wherein said further acquisition parameter comprises an acquisition sensitivity and/or a focus position of the linear camera.

10. The method according to claim 1, further comprising providing said linear camera with an electronic shutter, said electronic shutter being driven in the interval of time that elapses between the acquisition of an image line and the subsequent acquisition, such as to prevent said linear camera continuing to acquire in said interval of time.

11. The method according to claim 1, further comprising connecting said advance sensor to said linear camera, or to said control device, via a dedicated data transmission line.

12. The method according to claim 1, wherein said at least one dimension comprises overall dimensions of said object in the advancing direction of said movable supporting plane and/or a height of said object.

* * * * *